United States Patent [19]
Saka

[11] Patent Number: 5,398,064
[45] Date of Patent: Mar. 14, 1995

[54] CAMERA SYSTEM WITH AUTOMATIC VARIATOR COMPENSATION IN A ZOOMING MODE OF OPERATION

[75] Inventor: Manami Saka, Kyoto, Japan

[73] Assignee: Minolta Co., Ltd., Osaka, Japan

[21] Appl. No.: 171,851

[22] Filed: Dec. 21, 1993

Related U.S. Application Data

[63] Continuation of Ser. No. 698,619, May 10, 1991, abandoned.

[30] Foreign Application Priority Data

May 14, 1990 [JP] Japan ................... 2-123602

[51] Int. Cl.⁶ ............................................ H04N 5/232
[52] U.S. Cl. .................................. 348/347; 348/358; 359/690
[58] Field of Search ................ 348/358, 347, 351; 359/676, 683, 689, 690; H04N 5/232

[56] References Cited

U.S. PATENT DOCUMENTS

| | | | |
|---|---|---|---|
| 4,558,367 | 12/1985 | Urata et al. | 358/227 |
| 4,570,185 | 2/1986 | Arai et al. | 358/227 |
| 4,623,226 | 11/1986 | Fujii | 359/690 |
| 4,924,317 | 5/1990 | Hirao et al. | 358/227 |
| 4,950,054 | 8/1990 | Wada et al. | 348/347 X |
| 5,029,010 | 7/1991 | Shiraishi | 358/227 |
| 5,101,278 | 3/1992 | Itsumi et al. | 358/227 |
| 5,148,209 | 9/1992 | Subbarao | 358/227 |
| 5,185,669 | 2/1993 | Kato | 358/227 |

FOREIGN PATENT DOCUMENTS

| | | | |
|---|---|---|---|
| 55-149575 | 11/1980 | Japan | 358/227 |
| 63-121830 | 5/1988 | Japan | 358/227 |
| 63-167316 | 7/1988 | Japan | 358/227 |

*Primary Examiner*—Michael T. Razavi
*Assistant Examiner*—Wendy R. Greening
*Attorney, Agent, or Firm*—Price, Gess & Ubell

[57] ABSTRACT

A camera system including an objective lens system and a camera body comprises: a movable lens unit included in the objective lens system to act as a variator for varying a focal length of whole of the objective lens system; a CCD for receiving light passed through the objective lens system to pick up an image formed by the objective lens system; a motor for shifting the CCD along the optical axis of the objective lens system; a first detector for detecting a position of an image formed by the objective lens system to produce a defocus signal representing the position of the image; a second detector for detecting a position of the movable lens unit along the optical axis to produce a lens position signal representing the detected position of the movable lens unit; and a controller for controlling the motor in accordance with both of the defocus signal and the lens position signal to bring the light receiver to the position of the image formed by the objective lens system. According to the above feature, a camera system is realized where a varifocal lens system has a satisfactorily small total length and weight because the shifting CCD serves the function of a compensator lens, and the lens system can be driven at a sufficiently high speed for an AF operation with a video camera, etc.

29 Claims, 7 Drawing Sheets

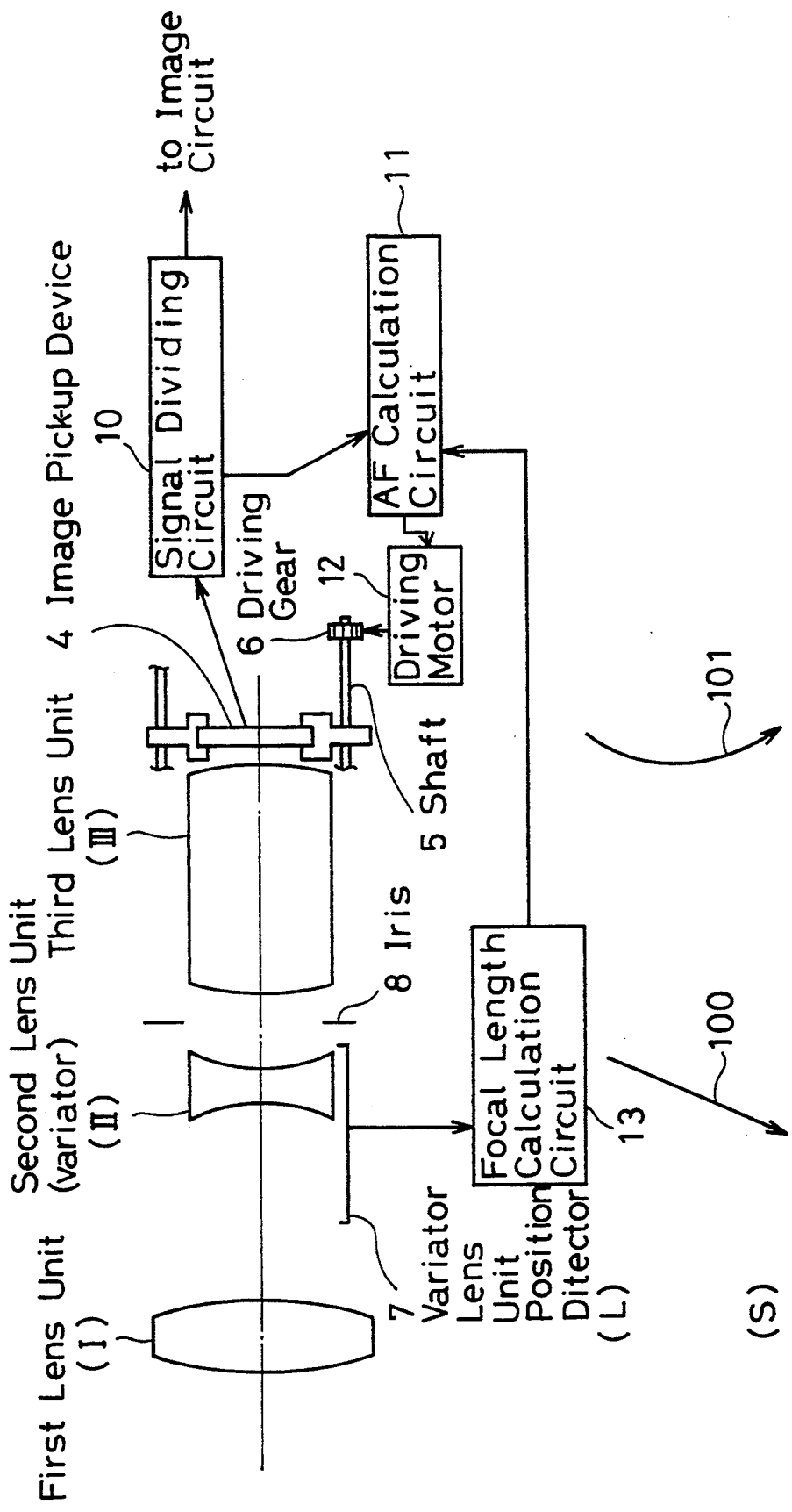

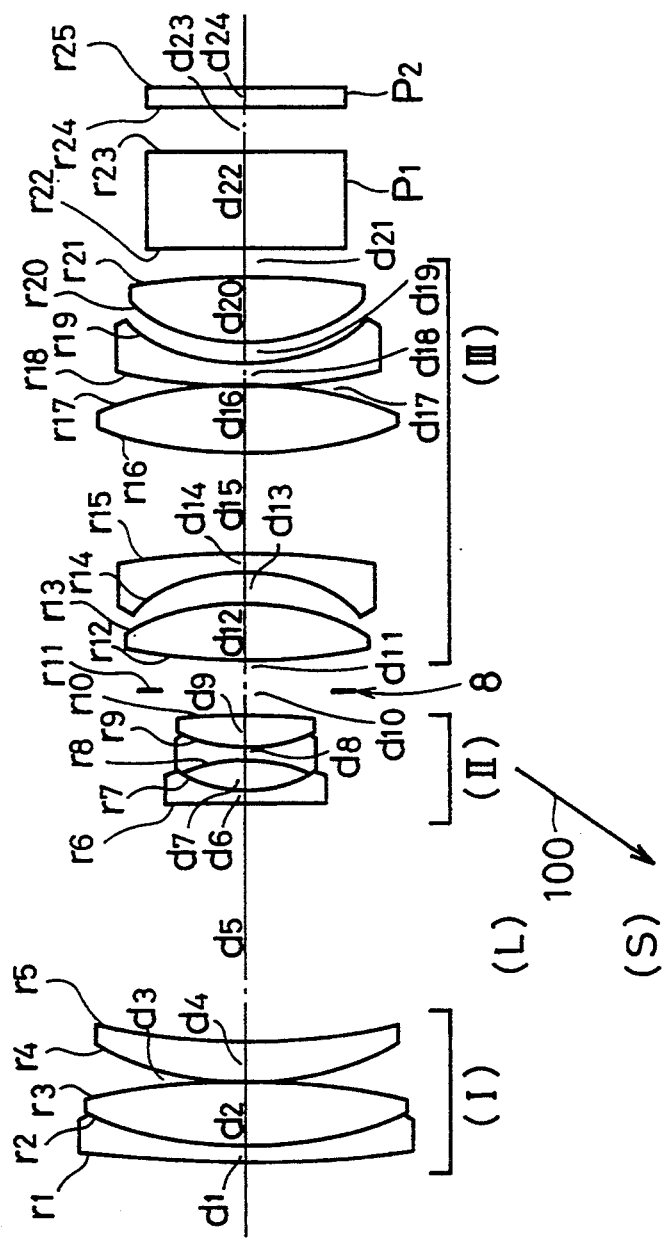
Fig. 2 (Embodiment 1)

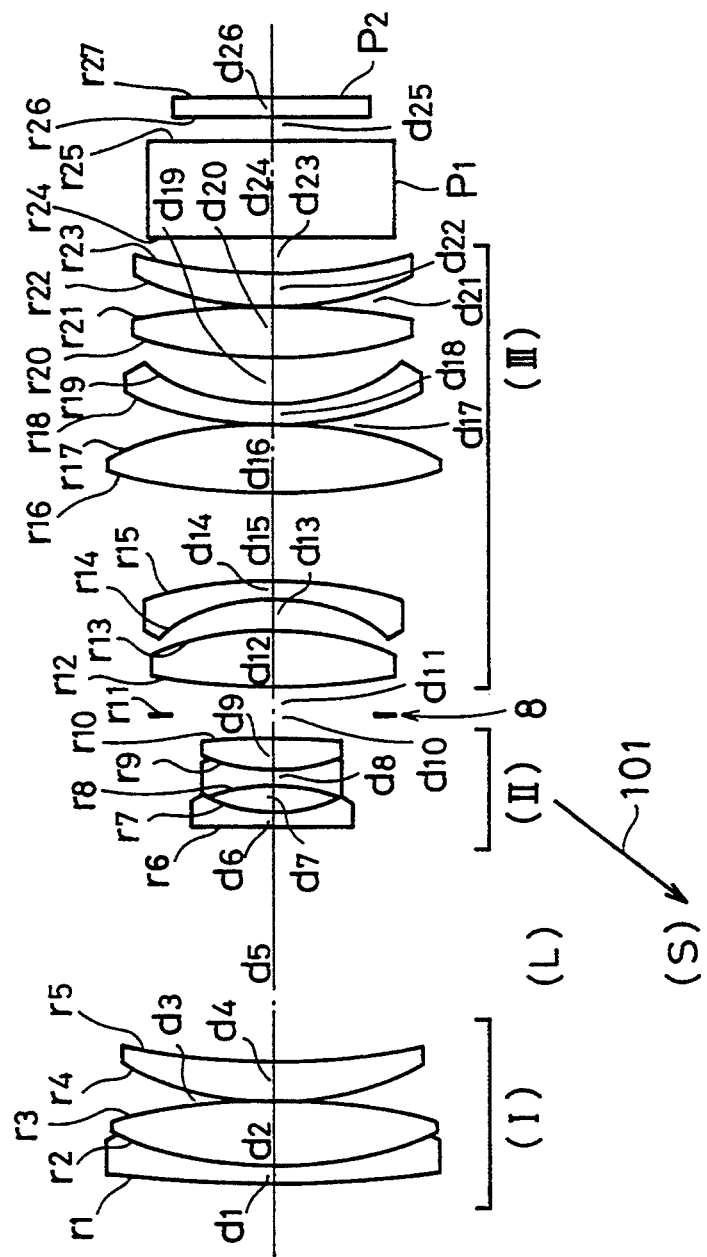
Fig. 3 (Embodiment 2)

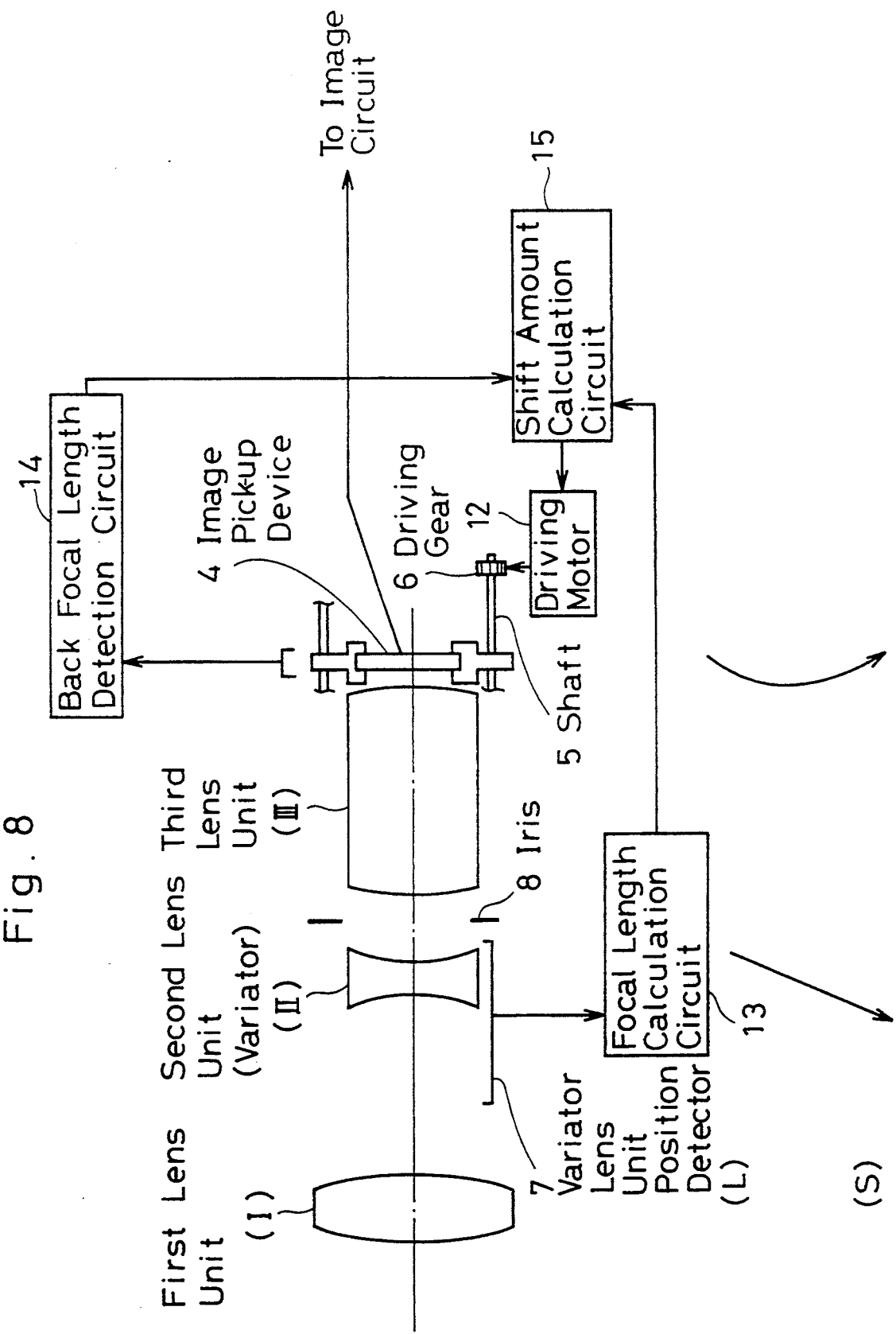

CAMERA SYSTEM WITH AUTOMATIC VARIATOR COMPENSATION IN A ZOOMING MODE OF OPERATION

This application is a continuation of U.S. Ser. No. 698,619, filed May 10, 1991, now abandoned.

BACKGROUND OF THE INVENTION

1. Field of the Invention

The present invention relates to a camera system. More particularly, the present invention relates to a camera system where a compact varifocal lens system is applicable.

2. Description of the Prior Arts

Conventionally, four-component zoom lens system having a zoom ratio of approximately 6× has often been employed for an optical system of a video camera. Generally, such zoom lens system comprises a front lens component having a positive refractive power which is moved out in a focusing operation, a variator lens component having a negative refractive power, a compensator lens component having a negative or a positive refractive power and a master lens component.

Since, recently, a demand has been increasing for compact zoom lens systems for a video camera, zoom lens systems have been also proposed where a focusing operation is performed by an inner or a rear lens instead of component by a front lens component. For example, in U.S. Pat. No. 4,824,226, a focusing is operation performed by a compensator lens component, and in Japanese laid-open Patent Applications No. S59-28120 and No. S59-28121, by the rearmost lens element in a master lens component. For the zoom lens systems, a front lens component is employable which has a diameter smaller than that of a zoom lens system where a focusing operation is performed by the front lens component. A total length and weight of a zoom lens system decrease as the diameter of the front lens component decreases.

However, a satisfactory compactness is not obtainable since it is required to provide enough space on the front or the rear side of a focusing lens component to secure a sufficient shift amount for focusing.

Another zoom lens system has been also proposed which comprises a fixed front lens component having a positive refractive power, a variator lens component having a negative refractive power, a fixed lens component having a positive refractive power, and a compensator and focusing lens component having a positive refractive power. For example, in U.S. Pat. No. 4,818,083, a zoom lens system is proposed in which the compensator lens component in the conventional four-component zoom lens system is omitted and a rear lens unit of the master lens component serves as a compensator and focusing lens unit. Said rear lens unit of the master lens component, serving as a compensator and focusing lens unit, is located to have a relatively large space from a lens unit located at the object side of the rear lens unit, for being shiftable in both of the focusing operation and the zooming operation. In this zoom lens system, the number of lens elements can be reduced by omitting the compensator lens component. Also, no additional space is required for the focusing operation since the relatively large space in the master lens component is utilized therefor. Thus, the total length of this zoom lens system and the weight thereof can be decreased in comparison with the conventional four-component zoom lens system.

However, since the rear lens unit of the master lens component, serving as a compensator and focusing lens unit, consists of three or four lens elements in this zoom lens system, it is comparatively heavy as a movable lens unit (the weight of said compensator and focusing lens unit is twice or more times the weight of the compensator lens component in the conventional four-component zoom lens system). Therefore, the power required for driving said compensator and focusing lens unit is relatively in large in comparison with that required for driving the compensator lens component in the conventional four-component zoom lens system. Thus, this zoom lens system having said compensator and focusing lens unit is not suitable for the lens system in a video camera in which a focusing lens component must be driven at a high speed for a quick automatic focusing operation.

SUMMARY OF THE INVENTION

An object of the present invention is to provide a camera system where a varifocal lens system has a satisfactorily small total length and weight, and is driven at a sufficiently high speed at an AF operation with a video camera, etc.

To achieve the above-described object, the present invention provides a camera system including an objective lens system and a camera body, comprising: a movable lens unit, included in the objective lens system, and movable, with respect to said camera body, for varying a focal length of whole of said objective lens system; means for receiving light which has passed through said objective lens system to pick up an image formed by said objective lens system; means, provided in said camera body, for shifting said light receiving means with respect to said camera body along the optical axis of the objective lens system; first means for detecting a position of an image formed by said objective lens system to produce a defocus signal representing the position of the image; second means for detecting a position of said movable lens unit along the optical axis of said objective lens system to produce a lens position signal representing the position of said movable lens unit detected; and means for controlling said shifting means in accordance with both of the defocus signal and the lens position signal to bring the light receiving means to the position of the image formed by said objective lens system.

The present invention further provides a camera system including an objective lens system and a camera body, comprising: movable lens unit, included in the objective lens system, and movable, with respect to said camera body, for varying a focal length of the whole of said objective lens system; means for receiving light passed through said objective lens system to pick up an image formed by said objective lens system; means, provided in said camera body, for shifting said light receiving means with respect to said camera body along the optical axis of the objective lens system; means for detecting a position of an image formed by said objective lens system to produce a defocus signal representing the position of the image; and means for controlling said shifting means in accordance with the defocus signal to bring the light receiving the means to the position of the image formed by said objective lens system.

The present invention further provides a camera system including an objective lens system and a camera body, comprising: a movable lens unit, included in the objective lens system, and movable, with respect to said camera body, for varying a focal length of the whole of said objective lens system; means for receiving light passed through said objective lens system to pick up an image formed by said objective lens system; means, provided in said camera body, for shifting said light receiving means with respect to said camera body along the optical axis of the objective lens system; means for detecting a position of said movable lens unit along the optical axis of said objective lens system to produce a lens position signal representing the position of said movable lens group detected; means for detecting the position of said light receiving means with respect to said camera body along the optical axis of the objective lens system to produce a light receiving means position signal representing the position of said light receiving means detected; and means for controlling said shifting means in accordance with both of the lens position signal and the light receiving means position signal to bring the light receiving means to the position of the image formed by said objective lens system.

A video camera generally includes an image pick-up device such as charge coupled device (CCD), etc. on an image plane. Normally, the image pick-up device in a is fixed in a camera body, where an image formed by the lens system is so corrected as to be positioned on the light receiving plane of the image pick-up device by moving two or more lens components of the zoom lens system.

However, the conventional compensator lens component does not move so much. Therefore, even if a lens unit serving as a compensator lens component is fixed, the shift amount of a position of an image plane along the optical axis is frequently a few or less millimeters.

In such cases, the weight and shift amount of the movable lens unit scarcely change even if the image pick-up device is moved to a position of an image plane instead of correcting the position of the image plane by moving the compensator lens component. Moreover, since the refractive power of the compensator lens component is relatively weak, the compensator lens component is omittable if the compensator lens component is not required to correct a position of an image plane.

Therefore, it is more advantageous to move the image pick-up device to a position of an image plane. In the present invention, the total length as well as the weight of the zoom lens system is reduced, because a position of an image plane is corrected by moving the image pick-up device to the position of the image plane and a movable lens unit for correcting a variation of a position of an image plane in a zooming operation, such as a compensator lens component, is omitted from a zoom lens system. Consequently, the load of a control system is reduced, which enables a high-speed drive control.

Moreover, in the present invention, it is preferable that said image pick-up device is movable backward and forward along the optical axis to perform a focusing operation in photographing an object close to the camera.

In a zoom lens system having frequently been used conventionally where a focusing operation is performed by shifting a front lens component, a front lens component is required to have a large diameter in order to take a sufficient illumination ratio of an off-axial light. In a conventional four-component zoom lens system, half the weight of the entire zoom lens system is the weight of the front lens component. To reduce the weight of the entire zoom lens system, the size of the front lens component should be decreased as much as possible.

For this purpose, zoom lens systems are proposed where a focusing operation is performed by shifting an inner or a rear lens component. However, to simplify the composition of a lens barrel, it is preferable that the zoom lens system has a fewer number of movable lens units and that a variation in aberration caused by a shift of a movable lens unit is small. Considering the above, it is more advantageous to perform a focusing operation by moving the image pick-up device.

BRIEF DESCRIPTION OF THE DRAWINGS

These and other objects and features of this invention will become clear from the following description taken in conjunction with the preferred embodiments with reference to the accompanied drawings in which:

FIG. 1 is a schematic view of an optical system according to an embodiment of the present invention.

FIG. 2 is a cross-sectional view of an optical system of the first embodiment of a camera system constructed in accordance with the present invention.

FIG. 3 is a cross-sectional view of an optical system of the second embodiment of a camera system in accordance with the present invention.

FIG. 8 is a cross-sectional view of an optical system of the fifth embodiment of a camera system constructed in accordance with the present invention.

DETAILED DESCRIPTION OF THE PREFERRED EMBODIMENTS

Figure 4A:
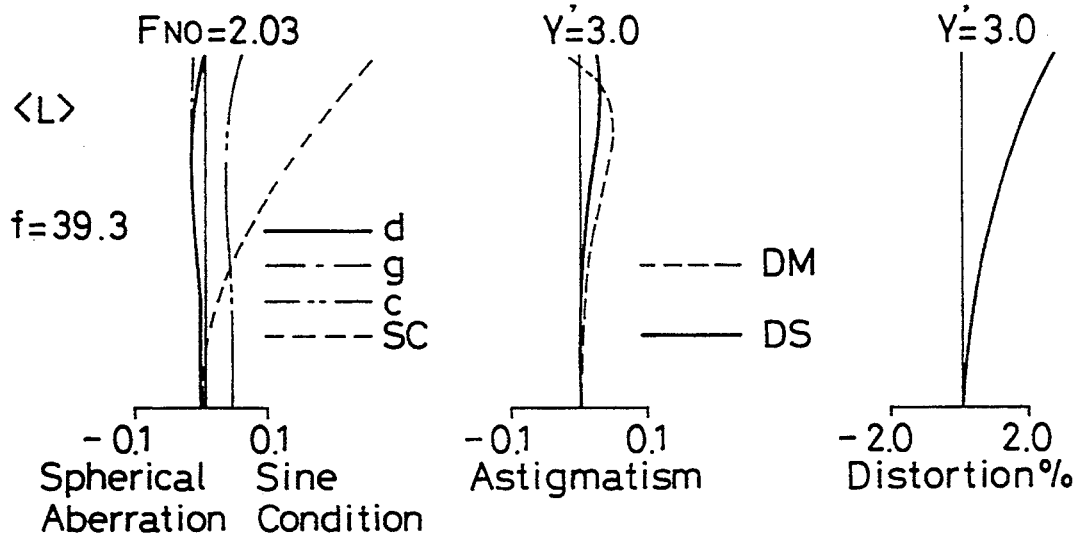
FIGS. 4A, 4B, and 4C represent the aberration curves of the first embodiment.
Figure 4B:
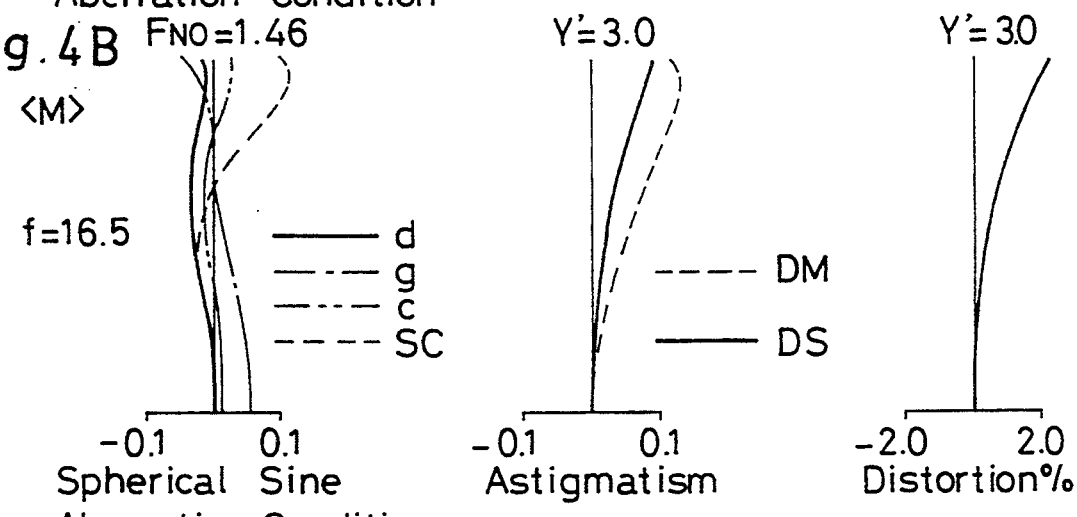
Figure 4C:
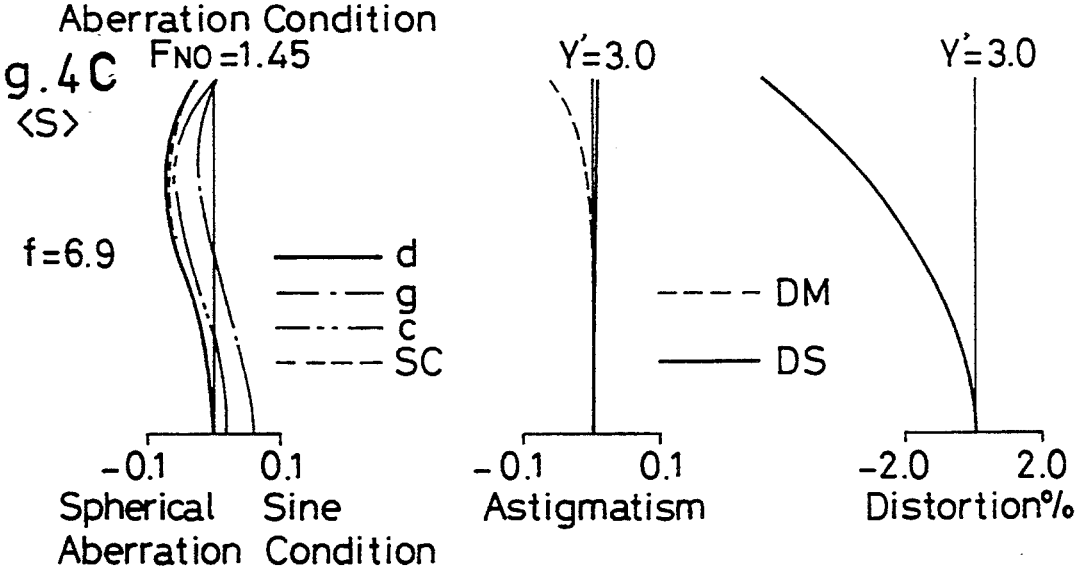
Figure 5A:
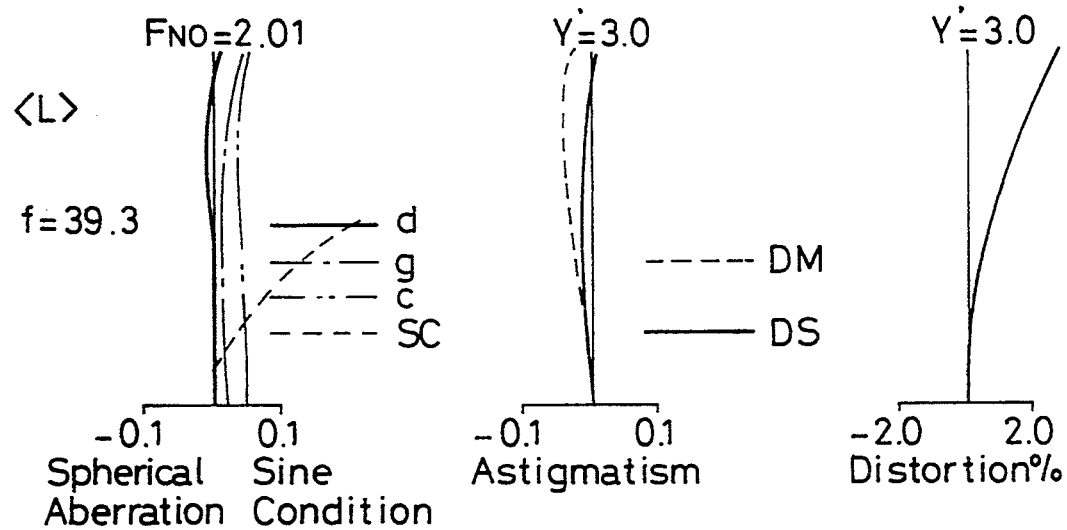
FIGS. 5A, 5B, and 5C represent the aberration curves of the second embodiment.
Figure 5B:
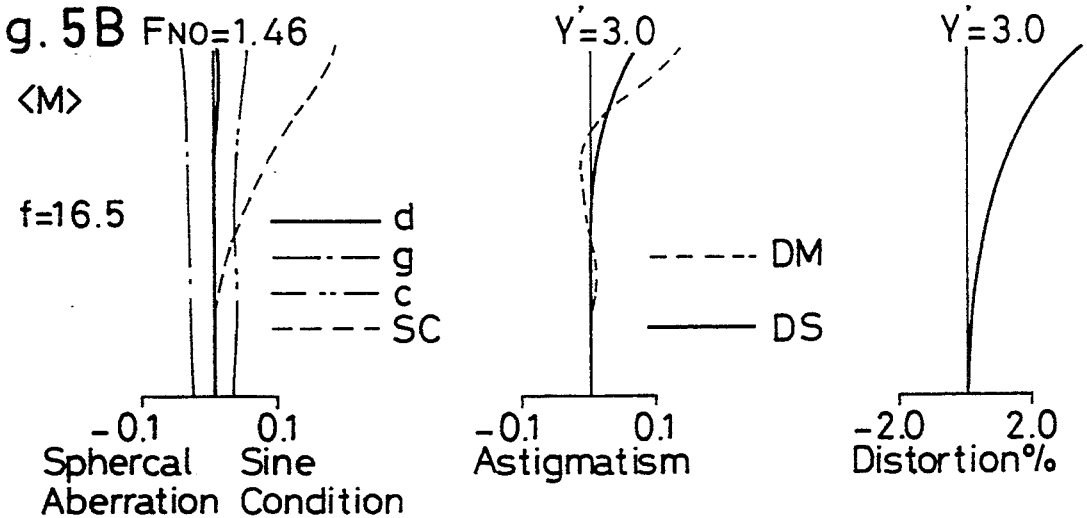
Figure 5C:
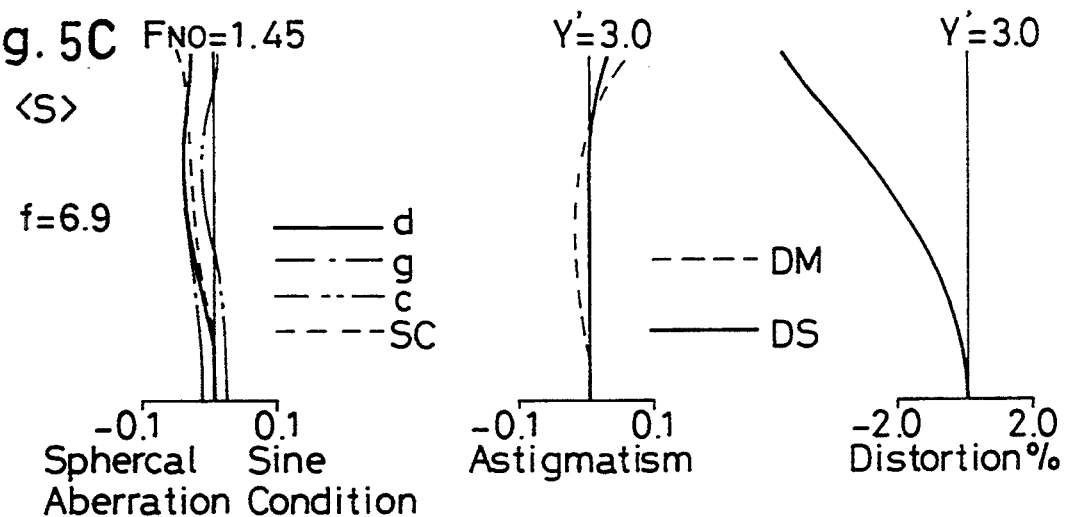

As shown in FIG. 1, the present invention provides a camera system including an objective lens system and a camera body, comprising: a movable lens unit II, included in the objective lens system, and movable, with respect to said camera body, for varying a focal length of whole of said objective lens system to pick up an image formed by said objective lens system; means 4 for receiving light which has passed through said objective lens system to pick up an image formed by said objective lens system; means 12, provided in said camera body, for shifting said light receiving means with respect to said camera body along the optical axis of the objective lens system, first means 11 for detecting a position of an image formed by said objective lens system to produce a defocus signal representing the position of the image; second means 7 for detecting a position of said movable lens unit along the optical axis of said objective lens system to produce a lens position signal representing the position of said movable lens unit detected; and means 11 for controlling said shifting means in accordance with both of the defocus signal and the lens position signal to bring the light receiving means to the position of the image formed by said objective lens system.

Additionally, as shown in FIG. 8, the present invention further provides a camera system including an objective lens system and a camera body, comprising: a movable lens unit included in the objective lens system, and movable, with respect to said camera body, for varying a focal length of whole of said objective lens system; means 4 for receiving light which has passed through said objective lens system to pick up an image formed by said objective lens system; means 12, provided in said camera body, for shifting said light receiving means with respect to said camera body along the optical axis of the objective lens system; means 7 for detecting a position of said movable lens unit along the optical axis of said objective lens system to produce a lens position signal representing the position of said movable lens group detected; means 14 for detecting the position of said light receiving means with respect to said camera body along the optical axis of the objective lens system to produce a light receiving means position signal representing the position of said light receiving means detected; and means 15 for controlling said shifting means in accordance with both of the lens position signal and the light receiving means position signal to bring the light receiving means to the position of the image formed by said objective lens system.

Moreover, it is more advantageous to move the light receiving means (the image pick-up device) which is lightweight to reduce the load of the control system at a high-speed AF operation.

In addition, it is preferable that said zoom lens system (a varifocal lens system) consists of, from the object side, a first lens unit having a positive refractive power and being stationary, a second lens unit having a negative refractive power and being movable backward and forward along the optical axis in a zooming operation, and a third lens unit having a positive refractive power and being stationary.

With such lens arrangement, the diameter of the front lens component and the total length of the zoom lens system are reduced, so that a lightweight and compact camera system is realized.

In the present invention, it is preferable that said second and third lens units fulfills the following conditions:

$$\{1-(Z^{\frac{1}{2}}/10)\} \times 0.9 < |\phi II/\phi S - | < \{1+(Z^{\frac{1}{2}}/100)\} \times 0.9 \quad (1)$$

$$0.3 < \phi III/\phi S < 1.2 \quad (2)$$

wherein:
Z represents a zoom ratio;
$\phi II$ represents a refractive power of the second lens unit;
$\phi III$ represents a refractive power of the third lens unit; and
$\phi S$ represents a total refractive power of the entire zoom lens system at the shortest focal length condition.

If the lower limit of the condition (1) is exceeded to weaken the absolute value of the refractive power of the second lens unit, no space for moving the image pick-up device is obtained at the shortest focal length condition, so that the zoom lens system cannot be in-focus at an object close to the camera. If the upper limit of the condition (1) is exceeded to increase the absolute value of the refractive power of the second lens unit, the variation in aberration at a zooming operation increases, so that a large amount of negative distortion is generated or an image plane is inclined especially at the shortest focal length condition.

If the lower limit of the condition (2) is exceeded to weaken the refractive power of the third lens unit, the lens back at the shortest focal length condition decreases, so that no space for moving the image pick-up device is obtained and the zoom lens system cannot be in-focus at an object close to the camera. If the upper limit of the condition (2) is exceeded to increase the refractive power of the third lens unit, the variation in aberration at a zooming operation increases, so that a large amount of negative distortion is generated at the shortest focal length condition.

Moreover, it is preferable that said first lens unit consists of three lens elements including at least one negative lens element, that said second lens unit consists of three lens units including at least one positive lens element, and that said third lens unit includes at least one positive lens element and at least one negative lens element.

The foremost and rearmost lens elements, both of which have a positive refractive power, of the third lens unit preferably fulfills the following conditions (3) and (4):

$$-1.00 < r_b/r_a < 0.25 \quad (3)$$

$$-0.30 < r_c/r_d < 0.60 \quad (4)$$

wherein:
$r_a$ represents paraxial radius of curvature of the object-side surface of the foremost lens element of the third lens unit;
$r_b$ represents paraxial radius of curvature of the image-side surface of the foremost lens element of the third lens unit;
$r_c$ represents a paraxial radius of curvature of the object-side surface of the rearmost lens element of the third lens unit; and
$r_d$ represents paraxial radius of curvature of the image-side surface of the rearmost lens element of the third lens unit.

If the lower limit of the condition (3) is exceeded so that the foremost positive lens element of the third lens unit becomes a bi-convex lens element, spherical aberration becomes remarkably "over" and an excellent axial performance is not obtained. If the upper limit of the condition (3) is exceeded so that said positive lens element of the third lens unit becomes a meniscus lens element, spherical aberration becomes remarkably "under" and an excellent axial aberration is not obtained as well.

If the lower limit of the condition (4) is exceeded so that the rearmost positive lens element of the third lens unit becomes a bi-convex lens element, inward coma is generated or field curvature remarkably increases. If the upper limit of the condition (4) is exceeded so that said positive lens element becomes a meniscus lens element, outward coma is generated or field curvature remarkably increases. In either case, the off-axial performance against the axial performance strikingly deteriorates, so that a satisfactory performance is not obtained at the middle zone of an image plane.

The above-mentioned lens arrangement enables a realization of a camera system having a fewer number of lens elements and where a variation in aberration is small at a zooming operation.

Further, it is preferable that the third lens unit consists of, from the object side, one or two positive lens elements, a negative lens element, a large air space, one or two positive lens elements, a negative lens element, and one or two positive lens elements. The large air space is provided to simultaneously correct distortion and field curvature. If the air space is small, negative distortion is generated, so that the image plane bends toward the under side.

Such lens system enables a realization of a camera system having a large aperture and where both of field curvature and coma are sufficiently corrected.

Furthermore, the third lens unit preferably fulfills the following condition (5):

$$5.5 < (TLIII)/(\phi III \cdot f_s^2) < 13.5 \tag{5}$$

wherein:
TLIII represents a length from the top of the surface of the foremost lens element of the third lens unit to the top of the surface of the rearmost lens element of the third lens unit;
$f_s$ represents a focal length of the entire varifocal lens system at the shortest focal length condition.

The condition (5) is directed to a total length of the third lens unit. If the lower limit of the condition (5) is exceeded to shorten the total length of the third lens unit, it becomes impossible to excellently correct distortion, field curvature and coma of the varifocal lens system simultaneously. If the upper limit of the condition (5) is exceeded to increase the total length of the third lens unit, although the aberrations are excellently corrected, the total length becomes extremely long, which makes it impossible to realize a compact camera system.

Embodiments of the present invention will hereinafter be explained referring to the drawings.

FIG. 1 is a schematic view of an optical system according to the first embodiment of the present invention. The optical system comprises a first lens unit I, a second lens unit II (a variator lens unit), an iris 8, and a third lens unit III. A focusing operation is performed by moving image pick-up device 4 so that it becomes an image plane of the optical system. The second lens unit II is movable backward and forward along the optical axis to perform a zooming operation. In FIG. 1, a shift of the second lens unit II and that of the image pick-up device 4 from the longest focal length condition (L) to the shortest focal length condition (S) are shown by the arrows 100 and 101, respectively.

Signals generated by the image pick-up device are sent to a signal dividing circuit 10. Among the signals, the signals required for a focusing operation are derived and sent to an AF calculation circuit 11. The other signals are sent to an image circuit (not shown). The AF calculation circuit 11 calculates a shift amount of the image pick-up device 4 and actuates the image pick-up device 4 through a driving motor 12. The driving force of the driving motor 12 is transmitted to the image pick-up means 4 through a driving gear 6 and a shaft 5.

A deviation of an image plane generated in accordance with a zooming operation is corrected, basically, in the same manner as that of a focusing operation. To correct a deviation of an image plane more accurately, it is more preferable to move the image pick-up device according to a focal length of the optical system obtained by detecting the position of the second lens unit II. For this purpose, a position of the second lens unit II is detected by a variator lens unit position detector 7; information of the detected position is entered into a focal length calculating circuit 13; and the calculated focal length is sent to the AF calculation circuit 11. To be more specific, the variator lens unit position detector 7 comprises a movable lens holder for holding the second lens unit II, a position decoder pattern member and a fretting element attached to the lens holder for fretting the position decoder pattern.

In a case where an image plane is shaken upward and downward or rightward and leftward due to a shift of the optical axis caused while the image pick-up device 4 is being moved, a camera-shake prevention function in a video camera may be used. For example, the shake of the image plane is deleted by processing the video in signal the image circuit so that a slight movement of an image is countervailed. The image pick-up device 4, the signal diverging circuit 10 and the AF calculation circuit 11 constitute a image plane position detector.

If a focusing operation is performed by moving the image pick-up device 4, an AF operation can be performed in any optical systems. That is, with respect to a consumer video camera, since an AF operation can be performed even if a lens system is exchanged for another lens system, a shooting can be performed with various lens systems as well as with the initially attached lens system.

Data of the embodiments of FIGS. 2 and 3 will hereinafter be shown in Tables 1 and 2, wherein:
$r_i$ represents a radius of curvature of an ith lens surface counted from the object side;
$d_i$ represents an axial distance of an ith lens surface counted from the object side;
$N_i$ and $\nu_i$ represent a refractive index and an Abbe number to the d-line of an ith lens surface, respectively;
f represents a focal length of the entire zoom lens system; and
$F_{NO}$ represents an F-number.

Moreover, in Tables 1 and 2, a * mark in the radius of curvature column indicates that the surface is aspherical and is defined by the following equation which represents a configuration of an aspherical surface:

$$X_o = [h^2/r]/[1+(1-\epsilon \cdot (h^2/r^2))^{\frac{1}{2}}] + \epsilon A_i h^i$$

wherein:
$X_o$ represents a shift amount from the reference lens surface along the optical axis;
r represents a paraxial radius of curvature;
h represents a height in a direction perpendicular to the optical axis;
$A_i$ represents an aspherical coefficient of the ith order; and
$\epsilon$ represents a quadric curved surface parameter.

Furthermore, in Tables 1 and 2, the values of $|\phi II/\phi S|$ of the condition (1), $\phi III/\phi S$ of the condition (2), $r_b/r_a$ of the condition (3), $r_c/r_d$ of the condition (4), and $(TLIII)/(\phi III \cdot f_s^2)$ of the condition (5) are shown, respectively.

TABLE 1

<Embodiment 1>
f = 39.3~16.5~6.9  $F_{NO}$ = 2.03~1.46~1.45

| Radius of Curvature | Axial Distance | Refractive Index | Abbe Number |
|---|---|---|---|
| $r_1$ 77.420 | | | |
| | $d_1$ 1.200 | $N_1$ 1.80518 | $\nu_1$ 25.43 |
| $r_2$ 27.368 | | | |
| | $d_2$ 4.250 | $N_2$ 1.51680 | $\nu_2$ 64.20 |
| $r_3$ −51.226 | | | |
| | $d_3$ 0.100 | | |
| $r_4$ 20.218 | | | |
| | $d_4$ 2.850 | $N_3$ 1.71300 | $\nu_3$ 53.93 |
| $r_5$ 54.741 | | | |
| | $d_5$ 15.99~9.883~1.000 | | |
| $r_6$ 166.945 | | | |

TABLE 1-continued

<Embodiment 1>
f = 39.3~16.5~6.9 $F_{NO}$ = 2.03~1.46~1.45

| Radius of Curvature | Axial Distance | Refractive Index | Abbe Number |
|---|---|---|---|
| | $d_6$ 1.000 | $N_4$ 1.77250 | $v_4$ 49.77 |
| $r_7$ 8.791 | | | |
| | $d_7$ 1.950 | | |
| $r_8$ −11.309 | | | |
| | $d_8$ 0.900 | $N_5$ 1.71300 | $v_5$ 53.93 |
| $r_9$ 10.746 | | | |
| | $d_9$ 2.200 | $N_6$ 1.80518 | $v_6$ 25.43 |
| $r_{10}$ −67.357 | | | |
| | $d_{10}$ 1.650~7.764~16.647 | | |
| $r_{11}$ ∞ (iris) | | | |
| | $d_{11}$ 2.150 | | |
| $r_{12}$ 39.160 | | | |
| | $d_{12}$ 3.800 | $N_7$ 1.71300 | $v_7$ 53.93 |
| $r_{13}$ −17.589 | | | |
| | $d_{13}$ 2.150 | | |
| $r_{14}$ −11.148 | | | |
| | $d_{14}$ 1.300 | $N_8$ 1.65446 | $v_8$ 33.86 |
| $r_{15}$ −40.127 | | | |
| | $d_{15}$ 7.050 | | |
| $r_{16}$ 32.783 | | | |
| | $d_{16}$ 4.400 | $N_9$ 1.67000 | $v_9$ 57.07 |
| $r_{17}$ −23.851 | | | |
| | $d_{17}$ 0.100 | | |
| $r_{18}$ 37.995 | | | |
| | $d_{18}$ 1.300 | $N_{10}$ 1.80518 | $v_{10}$ 25.43 |
| $r_{19}$ 11.281 | | | |
| | $d_{19}$ 1.400 | | |
| $r_{20}$ 12.009 | | | |
| | $d_{20}$ 4.300 | $N_{11}$ 1.67000 | $v_{11}$ 57.07 |
| $r_{21}$* −58.527 | | | |
| | $d_{21}$ 2.250 | | |
| $r_{22}$ ∞ | | | |
| | $d_{22}$ 6.472 | $N_{12}$ 1.51680 | $v_{12}$ 64.20 |
| $r_{23}$ ∞ | | | |
| | $d_{23}$ 3.000 | | |
| $r_{24}$ ∞ | | | |
| | $d_{24}$ 1.300 | $N_{13}$ 1.51680 | $v_{13}$ 64.20 |
| $r_{25}$ ∞ | | | |

Aspherical coefficient
$r_{21}$:
$\epsilon = 0.10000 \times 10$
$A_4 = 0.54133 \times 10^{-4}$
$A_6 = 0.10062 \times 10^{-6}$
$A_8 = 0.57395 \times 10^{-9}$
Conditions (1) (2) (3) (4) (5)
$|\phi II/\phi S| = 0.889$
$\phi III/\phi S = 0.401$
$r_b/r_a = -0.449$
$r_c/r_d = -0.205$
$(TLIII)/(\phi III \cdot f_s^2) = 9.09$

TABLE 2

<Embodiment 2>
f = 39.3~16.5~6.9 $F_{NO}$ = 2.01~1.46~1.45

| Radius of Curvature | Axial Distance | Refractive Index | Abbe Number |
|---|---|---|---|
| $r_1$ 82.841 | | | |
| | $d_1$ 1.200 | $N_1$ 1.80518 | $v_1$ 25.43 |
| $r_2$ 27.286 | | | |
| | $d_2$ 4.350 | $N_2$ 1.51680 | $v_2$ 64.20 |
| $r_3$ −44.071 | | | |
| | $d_3$ 0.100 | | |
| $r_4$ 20.861 | | | |
| | $d_4$ 2.750 | $N_3$ 1.71300 | $v_3$ 53.93 |
| $r_5$ 56.262 | | | |
| | $d_5$ 15.914~9.843~1.000 | | |
| $r_6$ 178.151 | | | |
| | $d_6$ 1.000 | $N_4$ 1.77250 | $v_4$ 49.77 |
| $r_7$ 8.972 | | | |
| | $d_7$ 1.950 | | |
| $r_8$ −11.296 | | | |
| | $d_8$ 0.900 | $N_5$ 1.71300 | $v_5$ 53.93 |
| $r_9$ 11.547 | | | |
| | $d_9$ 2.200 | $N_6$ 1.80518 | $v_6$ 25.43 |
| $r_{10}$ −71.118 | | | |
| | $d_{10}$ 1.650~7.721~16.564 | | |

TABLE 2-continued

<Embodiment 2>
f = 39.3~16.5~6.9 $F_{NO}$ = 2.01~1.46~1.45

| Radius of Curvature | Axial Distance | Refractive Index | Abbe Number |
|---|---|---|---|
| $r_{11}$ ∞ (iris) | | | |
| | $d_{11}$ 2.150 | | |
| $r_{12}$ 53.468 | | | |
| | $d_{12}$ 3.600 | $N_7$ 1.71300 | $v_7$ 53.93 |
| $r_{13}$ −20.131 | | | |
| | $d_{13}$ 2.150 | | |
| $r_{14}$ −12.448 | | | |
| | $d_{14}$ 1.300 | $N_8$ 1.80518 | $v_8$ 25.43 |
| $r_{15}$ −27.885 | | | |
| | $d_{15}$ 6.050 | | |
| $r_{16}$ 39.579 | | | |
| | $d_{16}$ 4.500 | $N_9$ 1.67000 | $v_9$ 57.07 |
| $r_{17}$ −30.717 | | | |
| | $d_{17}$ 0.100 | | |
| $r_{18}$ 24.554 | | | |
| | $d_{18}$ 1.300 | $N_{10}$ 1.84666 | $v_{10}$ 23.82 |
| $r_{19}$ 14.355 | | | |
| | $d_{19}$ 3.200 | | |
| $r_{20}$ 27.294 | | | |
| | $d_{20}$ 3.400 | $N_{11}$ 1.67000 | $v_{11}$ 57.07 |
| $r_{21}$ −62.269 | | | |
| | $d_{21}$ 0.100 | | |
| $r_{22}$ 20.816 | | | |
| | $d_{22}$ 2.500 | $N_{12}$ 1.67000 | $v_{12}$ 57.07 |
| $r_{23}$ 40.237 | | | |
| | $d_{23}$ 2.250 | | |
| $r_{24}$ ∞ | | | |
| | $d_{24}$ 6.472 | $N_{13}$ 1.51680 | $v_{13}$ 64.20 |
| $r_{25}$ ∞ | | | |
| | $d_{25}$ 1.650 | | |
| $r_{26}$ ∞ | | | |
| | $d_{26}$ 1.300 | $N_{14}$ 1.51680 | $v_{14}$ 64.20 |
| $r_{27}$ ∞ | | | |

Conditions (1) (2) (3) (4) (5)
$|\phi II/\phi S| = 0.890$
$\phi III/\phi S = 0.339$
$r_b/r_a = -0.376$
$r_c/r_d = 0.517$
$(TLIII)/(\phi III \cdot f_s^2) = 10.27$ FIGS. 2 and 3 are cross-sectional views of lens arrangements of the embodiments 1 and 2, respectively, wherein a longest focal length condition of a first, a second and a third lens units I, II and III is shown. In FIGS. 2 and 3, a shift of the second lens unit II from the longest to the shortest focal length conditions is shown by the arrow 100.

An iris 8 is provided between the second lens unit II and the third lens unit III. Aberrations are corrected in a condition where a plate P1 corresponding to an IR cut glass and a low-pass filter and a plate P2 corresponding to a face plate for protecting a CCD surface are inserted on the image side of the third lens unit III.

The embodiment 1 comprises a first lens unit I having a negative, a positive and a negative lens elements from the object side, a second lens unit II having a negative, a negative and a positive lens elements from the object side, and a third lens unit III having a positive, a negative, a positive, a negative and a positive lens elements from the object side, wherein the image-side surface of the fifth positive lens element, from the object side, of the third lens unit III is aspherical.

The embodiment 2 comprises a first lens unit I having a negative, a positive and a negative lens elements from the object side, a second lens unit II having a negative, a negative and a positive lens elements from the object side, and a third lens unit III having a positive, negative, a positive, a negative, a positive and a positive lens elements from the object side.

FIGS. 4A to 4C and 5A to 5C represent the aberration curves of the above-described embodiments 1 and 2 respectively, wherein (L), (M) and (S) represent the aberrations at the longest, middle, and shortest focal length conditions, respectively. The solid line d represents an aberration to the d-line, and the dotted line SC represents a sine condition. The dotted line DM and the solid line DS represent an astigmatism on a meridional and a sagittal image planes, respectively.

Figure 6:
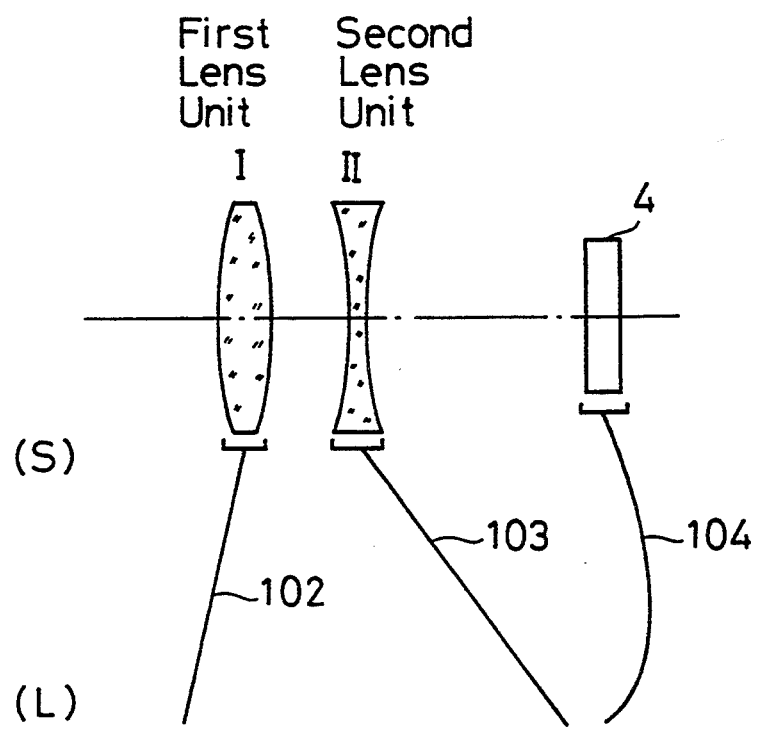
FIG. 6 is a cross-sectional view of an optical system of the third embodiment of a camera system constructed in accordance with the present invention.
Figure 7:
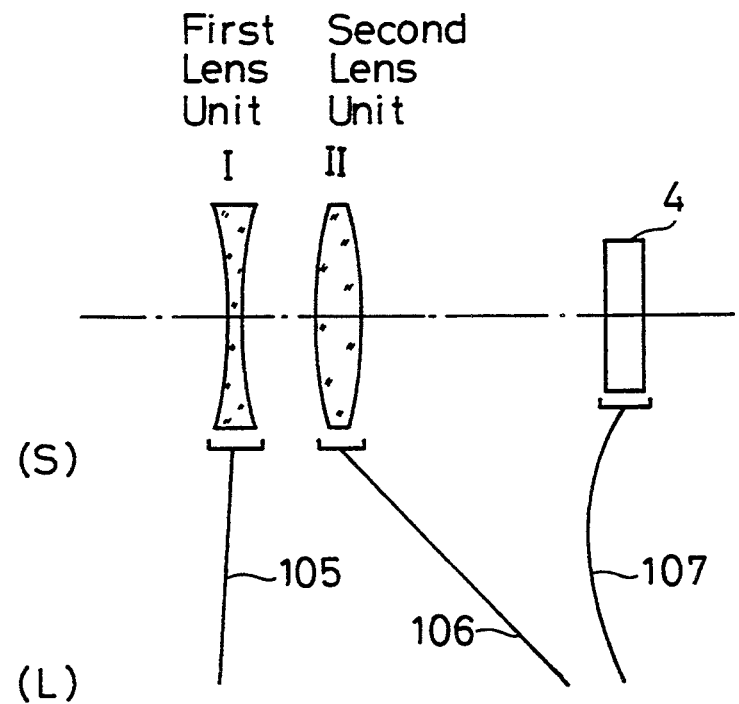
FIG. 7 is a cross-sectional view of an optical system of the fourth embodiment of a camera system constructed in accordance with the present invention.

Next, FIGS. 6 and 7 respectively show the third and fourth embodiments of an optical system of the camera system constructed in accordance with the present invention.

In FIG. 6, an objective lens system comprises a first lens unit I having a positive refractive power and a second lens unit II having a negative refractive power. The first lens unit I moves toward the object side along the optical axis as shown by an arrow 102 and the second lens unit II moves toward the image side along the optical axis as shown by an arrow 103 to vary the focal length of the objective lens system at a zooming operation. An image pick-up device 4 moves along the optical axis as shown by an arrow 104 at the zooming operation.

In FIG. 7, an objective lens system comprises a first lens unit I having a negative refractive power and a second lens unit II having a positive refractive power. The first lens unit I slightly moves toward the object side along the optical axis as shown by an arrow 105 and the second lens unit II moves toward the image side along the optical axis as shown by an arrow 106 to vary the focal length of the objective lens system at a zooming operation. An image pick-up device 4 moves along the optical axis as shown by an arrow 107.

In FIGS. 6 and 7, (S) represents a shortest focal length condition, and (L) represents a longest focal length condition.

In the above-mentioned embodiment shown in FIG. 1, the image pick-up device 4 is moved to its in-focus position based on the information, supplied from the focal length calculation circuit 13, on a focal length of the zoom lens system and the information, supplied from the AF calculation circuit 11, on a defocus amount and defocus direction. However, even if there is no information, from the focal length calculation circuit 13, on a focal length of the zoom lens system, the image pick-up device 4 can also be moved to its in-focus position based only on the information, from the AF calculation circuit 11, on a defocus amount and defocus direction.

On the other hand, it is possible to move the image pick-up device 4 to its in-focus position even if there is no information, from the AF calculation circuit 11, on a defocus amount and defocus direction. This is concretely described in the embodiment shown in FIG. 8. In FIG. 8, a back focal length detection circuit 14 detects distance between a third lens unit III of the zoom lens system and the image pick-up device 4, that is, a back focal length by detecting a position of the image pick-up device 4 along the optical axis. Instead of the signal dividing circuit 10 and the AF calculation circuit 11 shown in FIG. 1, the above-described back focal length detection circuit 14 and a shift amount calculation circuit 15 for calculating a shift amount required for moving the image pick-up device 4 to its in-focus position based on the information from the back focal length detection circuit 14 and on the information, from the focal length calculation circuit 13, on the focal length of the zoom lens system. The driving motor 12 moves the image pick-up device 4 to its in-focus position according to the shift amount calculated by the shift amount calculation circuit 15.

When the zoom lens system is in its in-focus position with respect to an object situated at a predetermined distance from the camera, hereinafter, $f_1$ represents a focal length of the entire zoom lens system obtained by detecting a position of a second lens unit II with the variator lens unit position detector 7, and $l_1$ represents a back focal length when the zoom lens system is in its infinity focusing position at this focal length $f_1$. Since the back focal length $l_1$ associates with the focal length $f_1$, the back focal length $l_1$ is obtained in the shift amount calculation circuit 15 by detecting the focal length $f_1$ with the focal length calculation circuit 13 and sending the focal length $f_1$ to the shift amount calculation circuit 15.

At this time, a back focal length $l_1'$ detected by the back focal length detection circuit 14 is sent to the shift amount calculation circuit 15. Then, the following equation is obtained from Newton's formula:

$$X_1(l_1'-l_1) = -f_1^2 \qquad (6)$$

wherein $X_1$ represents a distance from an object to a front focal point of the zoom lens system under the above condition.

Next, a zooming operation is performed by moving the second lens unit II. (Hereinafter, $f_2$ represents a focal length of the entire zoom lens system at this time, and $l_2$ represents a back focal length when the zoom lens system is in its infinity focusing position at this focal length $f_2$.) The focal length $f_2$ is calculated by the focal length calculation circuit 13. Since the back focal length associates with the focal length $f_2$, the back focal length $l_2$ is obtained in the shift amount calculation circuit 15 by detecting the focal length $f_2$ with the focal length calculation circuit 13 and sending the focal length $f_2$ to the shift amount calculation circuit 15. At this time, a back focal length $l_2'$ required for a focusing operation is obtained from Newton's formula as follows:

$$X_2(l_2'-l_2) = -f_2^2 \qquad (7)$$

wherein $X_2$ is a distance from an object to a front focal point of a zoom lens system.

Since $X_1$ approximates to $X_2(X_1 \approx X_2)$, the following equation is obtained from the above equations (6) and (7):

$$l_2' = l_2 + (l_1'-l_1)(f_2/f_1)^2$$

A shift amount $(l_2'-l_1')$ required for moving the image pick-up device 4 to its in-focus position is obtained by the shift amount calculation circuit 15.

At this time, if data showing a relation between the focal length and front focal point of the zoom lens system are previously stored in the shift amount calculation circuit 15, $X_1$ never approximates to $X_2$, so that a shift amount required for moving the image pick-up device 4 to its in-focus position is accurately obtained. In this since embodiment, a change of the front focal point due to a change of the focal length of the zoom lens system is considered and therefore, $X_1 \approx X_2$, it is premised that a position of an object, or an object point does not change.

Obviously, many modifications and variations of the present invention are possible in light of the above teachings. It is therefore to be understood that within the scope of the appended claims, the invention may be practiced other than as specifically described.

What is claimed is:

1. A camera system including an objective lens system without a compensator lens unit, comprising:
an objective lens system with an object end towards an object to be imaged by the lens system and an image end towards an image formed by the lens system, the lens system comprising:
a movable lens unit movable along an optical axis of the lens system for acting as a variator lens unit, for varying a focal length of the objective lens system;
means for moving the movable lens unit to change its position and thereby vary the focal length of the objective lens system;
means for detecting a position of the movable lens unit along the optical axis of the objective lens system to produce a lens position signal representing the position of the movable lens unit; and
a camera body having mounting means for attaching the objective lens system, the camera body comprising:
means for receiving light which has passed through the objective lens system to pick up the image formed by the objective lens system;
means for shifting the light receiving means with respect to the camera body along the optical axis of the objective lens system; and
means for controlling the shifting means in accordance with the lens position signal to make the light receiving means move to compensate for any image position deviation brought about by the movement of the movable lens unit in varying the focal length of the objective lens system, thereby causing the light receiving means to serve the function of a compensator lens.

2. The camera system as claimed in claim 1, wherein the objective lens system comprises, from the object end, a first lens unit having a positive refractive power and being stationary on the optical axis, a second lens unit, which is the movable lens unit, having a negative refractive power and being movable along the optical axis, and a third lens unit having a positive refractive power and being stationary on the optical axis.

3. A camera system as claimed in claim 2, wherein said objective lens system fulfills the following conditions:

$$\{1-(Z^{\frac{1}{2}}/10)\} \times 0.9 < |\phi II/\phi S- | < \{1+(Z^{\frac{1}{2}}/100)\} \times 0.9 \quad 0.3 < \phi III/\phi S < 1.2$$

wherein:
Z represents a zoom ratio of said objective lens system;
$\phi II$ represents a refractive power of the second lens unit;
$\phi III$ represents a refractive power of the third lens unit; and
$\phi S$ represents a total refractive power of the objective lens system in the shortest focal length condition.

4. The camera system as claimed in claim 2, wherein the first lens unit comprises three lens elements including at least one negative lens element, the second lens unit comprises three lens elements including at least one positive lens element, and the third lens unit comprises a positive lens element and a negative lens element.

5. The camera system as claimed in claim 2, wherein the first lens unit consists of, from the object end, a first positive lens element, a second negative lens element, and a third positive lens element, and wherein the first lens unit fulfills the following conditions:

$$-1.00 < r_b/r_a < 0.25$$

$$-0.30 < r_c/r_d < 0.60$$

wherein:
$r_a$ represents a radius of curvature of an object end surface of the first lens element;
$r_b$ represents a radius of curvature of an image end surface of the first lens element;
$r_c$ represents a radius of curvature of an object end surface of the third lens element; and
$r_d$ represents a radius of curvature of an image end surface of the third lens element.

6. The camera system as claimed in claim 2, wherein the third lens unit comprises, from the object end, a positive single lens element, a negative lens element, a positive single lens element, a negative lens element, and a positive single lens element.

7. The camera system as claimed in claim 1, wherein the movable lens unit of the objective lens system comprises, from the object end, a first lens unit movable in a predetermined direction along the optical axis to vary the focal length of the objective lens system, and a second lens unit movable in a direction opposite to the predetermined direction along the optical axis to vary the focal length of the objective lens system, the second lens unit having a sign of refractive power opposite to a sign of refractive power of the first lens unit.

8. The camera system as claimed in claim 7, wherein the first and the second lens units are shifted away from each other during movement to the longest focal length condition.

9. A camera system as claimed in claim 7, wherein said first lens unit has a positive refractive power and said second lens unit has a negative refractive power.

10. The camera system as claimed in claim 9, wherein the first lens unit is shifted towards the object end in a zooming operation from the shortest focal length condition to the a longest focal length condition, and the second lens unit is shifted towards the image end in the zooming operation from the shortest focal length condition to the longest focal length condition.

11. A camera system as claimed in claim 7, wherein said first lens unit has a negative refractive power and said second lens unit has a positive refractive power.

12. The camera system as claimed in claim 11, wherein the first lens unit is shifted towards the image end in a zooming operation from the shortest focal length condition to the longest focal length condition, and the second lens unit is shifted towards the object end in the zooming operation from the shortest focal length condition to the longest focal length condition.

13. In a camera system, the improvement comprising:
an objective lens means for producing an image;
varying means for changing focal length of the objective means without use of a compensator lens;
receiving means for receiving light which has passed through the objective lens means to pick up the image formed by the objective lens means;

means for detecting the focal length of the objective lens means; and means for shifting the receiving means in accordance with the detected focal length to compensate for any image position deviation brought about by varying the focal length, thereby causing the receiving means to serve the function of a compensator lens.

14. The invention of claim 13, wherein the objective lens means includes only one variator lens unit that moves causing a variation in its focal length.

15. In a camera system, the improvement comprising:
an objective lens system comprising, from an object side, facing an object to be imaged, to an image side, facing an image formed by the lens system:
a first positive lens unit being stationary on an optical axis of the objective lens system during a zooming operation;
a second negative lens unit being movable along the optical axis for varying a focal length of the objective lens during the zooming operation;
a third positive lens unit being stationary on the optical axis during a zooming operation;
receiving means for receiving light which has passed through the objective lens system to pick up an image formed by the objective lens system; and
means for shifting the receiving means in accordance with movement of the second lens unit to compensate for any image position deviation brought about by the movement of the second lens unit.

16. The invention of claim 15, wherein an air space is provided within the third lens unit of sufficient length along the optical axis to correct distortion and field curvature.

17. The invention of claim 15, wherein the means for shifting moves the receiving means towards and away from the objective lens system along the optical axis as the focal length varies during the zooming operation.

18. A combination of an optical zoom system and an image recording system of a lightweight and compact configuration comprising:
a zoom lens system for providing a variable focal length having a plurality of lens units including one movable lens unit moving along an optical axis to provide the variable focal length zooming, while the other lens units remain stationary;
means for monitoring the position of the movable lens unit to provide a signal representative of the focal length position;
sensor means for receiving an image of an object from the zoom lens system and providing an image signal; means for automatically calculating a focus signal from the image signal;
means for calculating a variation signal of the focal length from the signal representative of the focal length position of the movable lens unit;
drive means for moving the sensor means along the optical axis; and
control means for controlling the drive means in response to the output of the focus signal and the variation signal to drive the sensor means to a compensated and in-focus position relative to the focal length of the zoom lens system and the in-focus position of an object.

19. A camera system including an objective lens system without a compensator lens unit, comprising:
an objective lens system fulfilling the following conditions:

$$\{1-(Z^{\frac{1}{2}}/10)\}\times 0.9 < |\phi II/\phi S-1| < \{1+(Z^{\frac{1}{2}}/100)\}\times 0.9 \quad 0.3 < \phi III/\phi S < 1.2$$

wherein:
$Z$ represents a zoom ratio of said objective lens system;
$\phi II$ represents a refractive power of the second lens unit;
$\phi III$ represents a refractive power of the third lens unit; and
$\phi S$ represents a total refractive power of the objective lens system in the shortest focal length condition;
the lens system with an object end towards an object to be imaged by the lens system and an image end towards an image formed by the lens system comprising, from the object end:
a first lens unit having a positive refractive power and being stationary on the optical axis;
a second lens unit, which is a movable lens unit, having a negative refractive power and movable along the optical axis to serve as a variator lens for varying a focal length of the objective lens system;
a third lens unit having a positive refractive power and being stationary on the optical axis;
means for moving the movable lens unit to change its position and thereby vary the focal length of the objective lens system;
means for detecting a position of the movable lens unit along the optical axis of said objective lens system to produce a lens position signal representing the position of the movable lens unit; and
a camera body having mounting means for attaching the objective lens system, the camera body comprising:
means for receiving light which has passed through the objective lens system to pick up the image formed by the objective lens system;
means for shifting said light receiving means with respect to the camera body along the optical axis of the objective lens system; and
means for controlling the shifting means in accordance with the lens position signal to make the light receiving means move to compensate for any image position deviation brought about by the movement of the movable lens unit in varying the focal length of the objective lens system, the light receiving means thereby serving the function of a compensator lens.

20. The camera system as claimed in claim 19, wherein the first lens unit comprises three lens elements including at least one negative lens element, the second lens unit comprises three lens elements including at least one positive lens element, and the third lens unit comprises a positive lens element and a negative lens element.

21. The camera system as claimed in claim 19, wherein the first lens unit consists of, from the object end, a first positive lens element, a second negative lens element, and a third positive lens element, and wherein the first lens unit fulfills the following conditions:

$$-100 < r_b/r_a < 0.25$$

$$-0.30 < r_c/r_d < 0.60$$

wherein:
- $r_a$ represents a radius of curvature of an object end surface of the first lens element;
- $r_b$ represents a radius of curvature of an image end surface of the first lens element;
- $r_c$ represents a radius of curvature of an object end surface of the third lens element; and
- $r_d$ represents a radius of curvature of an image end surface of the third lens element.

22. The camera system as claimed in claim 19, wherein the third lens unit comprises, from the object end, a positive single lens element, a negative lens element, a positive single lens element, a negative lens element, and a positive single lens element.

23. The camera system as claimed in claim 19, wherein the movable lens unit of the objective lens system comprises, from the object end, a first lens unit movable in a predetermined direction along the optical axis to vary the focal length of the objective lens system, and a second lens unit movable in a direction opposite to the predetermined direction along the optical axis to vary the focal length of the objective lens system, the second lens unit having a sign of refractive power opposite to a sign of refractive power of the first lens unit.

24. The camera system as claimed in claim 23, wherein the first and the second lens units are shifted away from each other during movement to a longest focal length condition.

25. The camera system as claimed in claim 23, wherein the first lens unit has a positive refractive power and the second lens unit has a negative refractive power.

26. The camera system as claimed in claim 25, wherein the first lens unit is shifted towards the object end in a zooming operation from the shortest focal length condition to the a longest focal length condition, and the second lens unit is shifted towards the image end in the zooming operation from the shortest focal length condition to the longest focal length condition.

27. The camera system as claimed in claim 25, wherein the first lens unit has a negative refractive power and the second lens unit has a positive refractive power.

28. The camera system as claimed in claim 27, wherein the first lens unit is shifted towards the image end in a zooming operation from the shortest focal length condition to the longest focal length condition, and the second lens unit is shifted towards the object end in the zooming operation from the shortest focal length condition to the longest focal length condition.

29. An improved objective lens system comprising, from an object side, facing an object to be imaged, to an image side, facing an image formed by the lens system:
- a first positive lens unit being stationary on an optical axis of the objective lens system during a zooming operation;
- a second negative lens unit being movable along the optical axis for varying a focal length of the objective lens during the zooming operation;
- a third positive lens unit being stationary on the optical axis during a zooming operation and including an air space within the lens unit of sufficient length along the optical axis to correct distortion and field curvature;
- receiving means for receiving light which has passed through the lens units to pick up an image formed by the lens system; and
- means for shifting the receiving means in accordance with movement of the second lens unit to compensate for any image position deviation brought about by the movement of the second lens unit, the receiving means thereby serving the function of a compensator lens.

* * * * *